(12) United States Patent
Patterson

(10) Patent No.: US 9,092,145 B2
(45) Date of Patent: *Jul. 28, 2015

(54) SNAPSHOTTING OF A PERFORMANCE STORAGE SYSTEM IN A SYSTEM FOR PERFORMANCE IMPROVEMENT OF A CAPACITY OPTIMIZED STORAGE SYSTEM

(71) Applicant: EMC Corporation, Hopkinton, MA (US)

(72) Inventor: R. Hugo Patterson, Los Altos, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,910

(22) Filed: Jan. 23, 2014

(65) Prior Publication Data

US 2014/0201430 A1 Jul. 17, 2014

Related U.S. Application Data

(63) Continuation of application No. 12/887,402, filed on Sep. 21, 2010, now Pat. No. 8,677,052.

(60) Provisional application No. 61/277,271, filed on Sep. 22, 2009.

(51) Int. Cl.
*G06F 13/10* (2006.01)
*G06F 3/06* (2006.01)
*G06F 12/12* (2006.01)

(52) U.S. Cl.
CPC ............... *G06F 3/061* (2013.01); *G06F 3/065* (2013.01); *G06F 3/0608* (2013.01); *G06F 3/0611* (2013.01); *G06F 3/0641* (2013.01); *G06F 3/0679* (2013.01); *G06F 3/0685* (2013.01); *G06F 12/121* (2013.01)

(58) Field of Classification Search
None
See application file for complete search history.

(56) References Cited

U.S. PATENT DOCUMENTS

| | | | |
|---|---|---|---|
| 6,636,951 B1 | 10/2003 | Tachikawa | |
| 6,879,710 B1 | 4/2005 | Hinoue et al. | |
| 7,146,371 B2 | 12/2006 | Hofstee et al. | |
| 7,584,338 B1 * | 9/2009 | Bricker et al. | 711/162 |
| 8,095,756 B1 | 1/2012 | Somavarapu et al. | |
| 2005/0237821 A1 | 10/2005 | Dekker et al. | |
| 2010/0257403 A1 * | 10/2010 | Virk et al. | 714/15 |
| 2011/0016152 A1 * | 1/2011 | Popovski et al. | 707/797 |

* cited by examiner

*Primary Examiner* — Duc Doan
(74) *Attorney, Agent, or Firm* — Van Pelt, Yi & James LLP

(57) ABSTRACT

A system for storing data comprises a performance storage system for storing one or more data items. A data item of the one or more data items comprises a data file or a data block. The system further comprises a segment storage system for storing a snapshot of a stored data item of the one or more data items in the performance storage system. The taking of the snapshot of the stored data item enables recall of the stored data item as stored at a time of the snapshot. At least one newly stored segment is stored as a reference to a previously stored segment.

17 Claims, 8 Drawing Sheets

SNAPSHOTTING OF A PERFORMANCE STORAGE SYSTEM IN A SYSTEM FOR PERFORMANCE IMPROVEMENT OF A CAPACITY OPTIMIZED STORAGE SYSTEM

This application is a continuation of U.S. patent application Ser. No. 12/887,402, entitled SNAPSHOTTING OF A PERFORMANCE STORAGE SYSTEM IN A SYSTEM FOR PERFORMANCE IMPROVEMENT OF A CAPACITY OPTIMIZED STORAGE SYSTEM, now U.S. Pat. No. 8,677,052, filed Sep. 21, 2010 which is incorporated herein by reference for all purposes, which claims priority to U.S. Provisional Application No. 61/277,271, entitled PERFORMANCE IMPROVEMENT OF A CAPACITY OPTIMIZED STORAGE SYSTEM filed Sep. 22, 2009 which is incorporated herein by reference for all purposes.

BACKGROUND OF THE INVENTION

Segment deduplication storage systems are efficient in terms of storage capacity. In a segment deduplication storage system, a data stream or data block is broken into segments. Segments are stored in the event that a segment has not been previously stored. In the event that a segment has been previously stored, a reference is stored to the prior stored segment. Information is also stored on how stored segments are used to reconstruct the data stream or data block. However, segment deduplication storage systems are in some cases too slow for storing and retrieving data stored in the system. Storing can be too slow because prior stored segments must be searched to see if an incoming segment is the same as a prior stored segment. Retrieving can be too slow because data must be reconstructed from a number of data segments stored previously.

BRIEF DESCRIPTION OF THE DRAWINGS

Various embodiments of the invention are disclosed in the following detailed description and the accompanying drawings.

DETAILED DESCRIPTION

Figure 1A:
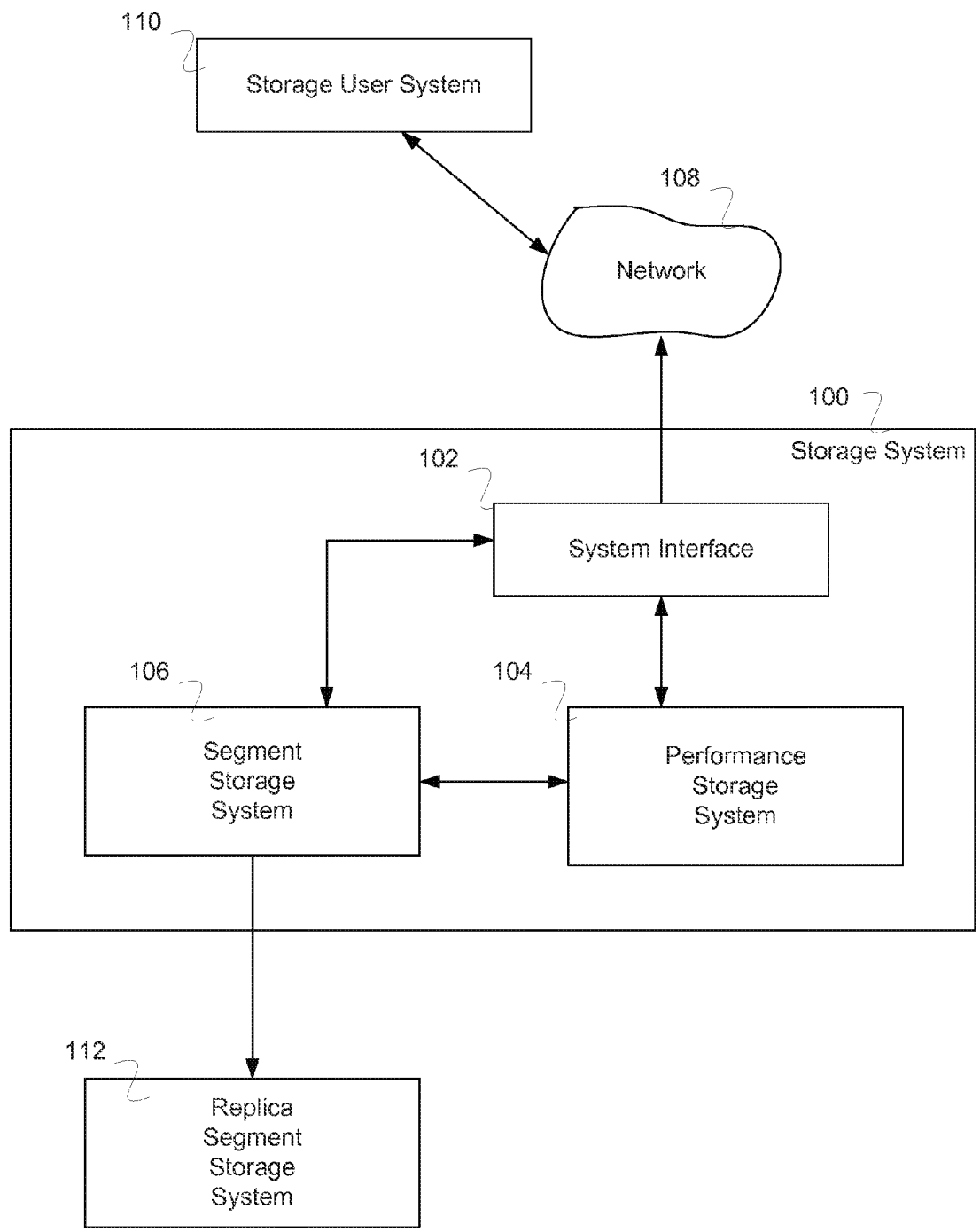
FIG. 1A is a block diagram illustrating an embodiment of a storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for storing data is disclosed. The system comprises a performance storage system for storing one or more data items. A data item of the one or more data items comprises a data file or a data block. The system further comprises a segment storage system for storing a snapshot of a stored data item of the one or more data items in the performance storage system. The taking of the snapshot of the stored data item enables recall of the stored data item as stored at the time of the snapshot. At least one newly written segment is stored as a reference to a previously stored segment.

In some embodiments, a system for storing data is disclosed. The system comprises a performance storage unit for storing a data stream or a data block in. The data stream or the data block comprises one or more data items. The system further comprises a segment storage system for automatically storing a stored data item of the one or more data items as a set of segments. The system further comprises a performance segment storage unit for storing the set of segments in the event that the stored data item has been stored using the segment storage system.

In some embodiments, a system for storing data is disclosed. The system comprises a performance storage unit and a performance segment storage unit. The system further comprises a determiner. The determiner determines whether a requested data is stored in the performance storage unit. The determiner determines whether the requested data is stored in the performance segment storage unit in the event that the requested data is not stored in the performance storage unit.

In some embodiments, a storage system provides performance by storing data in a performance storage system. The data stored in the performance storage system is automatically stored in a storage capacity optimized storage system (e.g., a segment storage system, a deduplicated segment storage system, a compressed storage system, etc.). In various embodiments, automatically storing occurs in the event that the performance storage system is full, that a file is finished being used, that a time period is completed, that a scheduled transfer is indicated, or any other appropriate criteria for automatically storing. In some embodiments, after automatically storing a data item in the capacity optimized storage system, the data item may be removed from the performance optimized storage system. In some embodiments, in the event that the data item is desired to be available with high performance to a user or another network attached system from the storage system, the data item is transferred back to the performance storage system. In some embodiments, the data item transferred back to the performance storage system is stored in a capacity optimized manner (e.g., as deduplicated segments, compressed, etc.).

In some embodiments, in the event that one or more data items is/are determined not to be needed for high performance access by a user or other network attached system from the storage system, the one or more data items is/are removed from the performance storage system. Prior to removal from the performance storage system, it is determined whether the one or more data items are stored in the capacity optimized storage system, and in the event that they are not, the one or more data items are stored to the capacity optimized storage system.

In some embodiments, the advantages of segment deduplication storage, which is efficient in terms of storage capacity by storing newly received segments as only references to a previously stored segment in the event that a received segment is already stored, is improved using performance storage, which enables efficient writing and reading both for data that has been stored as deduplicated segments and for data that has been stored as originally received.

In various embodiments, the storage system comprises a performance storage system running within the client/user system and the segment storage system running in a separate system; multiple performance storage systems fronting a common segment storage system; a bunch of application servers that have some fast local flash, for very fast access, but the segment storage is out on the network and replicated, or any other appropriate configuration of performance and segment system components running on any appropriate hardware.

Although the following embodiments are described with a capacity optimized storage comprising a segment storage, any other capacity optimized storage system can also be used—for example, a storage system using compression, using block level deduplication, delta deduplication, or any other appropriate capacity optimization for storage.

FIG. 1A is a block diagram illustrating an embodiment of a storage system. In the example shown, storage system 100 receives requests to store and/or to retrieve one or more data items. In various embodiments, the one or more data items is/are a part of a data stream or data block or any other appropriate data structure or grouping. Storage system 100 receives requests directly or via network 108 from storage user system 110. In some embodiments, storage user system 110 is one of a plurality of systems able to communicate requests to storage system 100.

Storage system 100 comprises system interface 102, performance storage system 104, and segment storage system 106. System interface 102 receives requests to store data items to and/or retrieve data items from storage system 100. System interface 102 passes retrieved data items to network 108 and/or storage user system 110. System interface 102 passes data items from network 108 and/or storage user system 110 to be stored by storage system 100.

Data items are stored using performance storage system 104. Performance storage system 104 is able to respond efficiently to requests for data to be stored and to be retrieved. Data items are transferred from performance storage system 104 to segment storage system 106. In some embodiments, segment storage system 106 receives data items from performance storage system 104, and the data items are processed to break data items into segments and to deduplicate the segments (e.g., to determine whether each segment has been previously stored, and in the event that the segment has been previously stored, storing a reference instead of storing the segment as received). In some embodiments, data items after being stored in segment storage system 106 are transferred back to performance storage system 104 and stored as a set of segments. In some embodiments, the original data items, stored as originally received, are removed from performance storage system 104 after the data items are transferred back to performance storage system 104.

In some embodiments, segment storage system 106 comprises a storage system that compresses segments (e.g., Lempel-Ziv compression, Lempel-Ziv-Welsh compression, Lempel-Ziv-Renau compression, etc.).

Data items that are requested via system interface 102 are retrieved from performance storage system 104 or segment storage system 106. In some embodiments, in the event that there are many requests for a data item that is stored in segment storage system 106 and not performance storage system 104, the data item may be transferred to performance storage system 104 so that storage system 100 response performance is improved.

In various embodiments performance storage system 104 comprises flash memory storage, a fiber channel storage device, persistent memory storage, a block addressable memory (e.g., 512K block addressable similar to a hard drive storage block, in contrast to a byte addressable memory or storage, fixed sized block addressing, and/or logical addressable memory), a file system organized memory, random access memory, or any other appropriate storage system or system component. In some embodiments, performance storage system 104 includes data stored as both a compressed data representation (e.g., a set of deduplicated segments) and an uncompressed data representation.

In various embodiments, the Segment Storage System 106 comprises a cluster of systems which together provide the functionality of the Segment Storage System.

In various embodiments, segment storage system 106 stores data item(s) using variable length segments, has content addressable segments (e.g., using a fingerprint of the segment), is replicated using replica segment storage system 112 (e.g., stores snapshots and/or segments as stored by segment storage system 106), is replicated according to a replication protocol (e.g., according to a time schedule, after a predetermined amount of data is stored, or any other appropriate protocol), has a data representation different from performance storage system 104 (e.g., set of segments vs. original data, content addressing vs. logical or physical addressing, variable block representation vs. fixed block, compressed vs. uncompressed data), or any other appropriate functionality for a segment storage system. In various embodiments, segment storage system 106 is replicated by a plurality of replica segment storage systems similar to replica segment storage system 112 that each replicate a portion of or all of the data items and/or snapshots as stored by segment storage system 106.

Figure 1B:
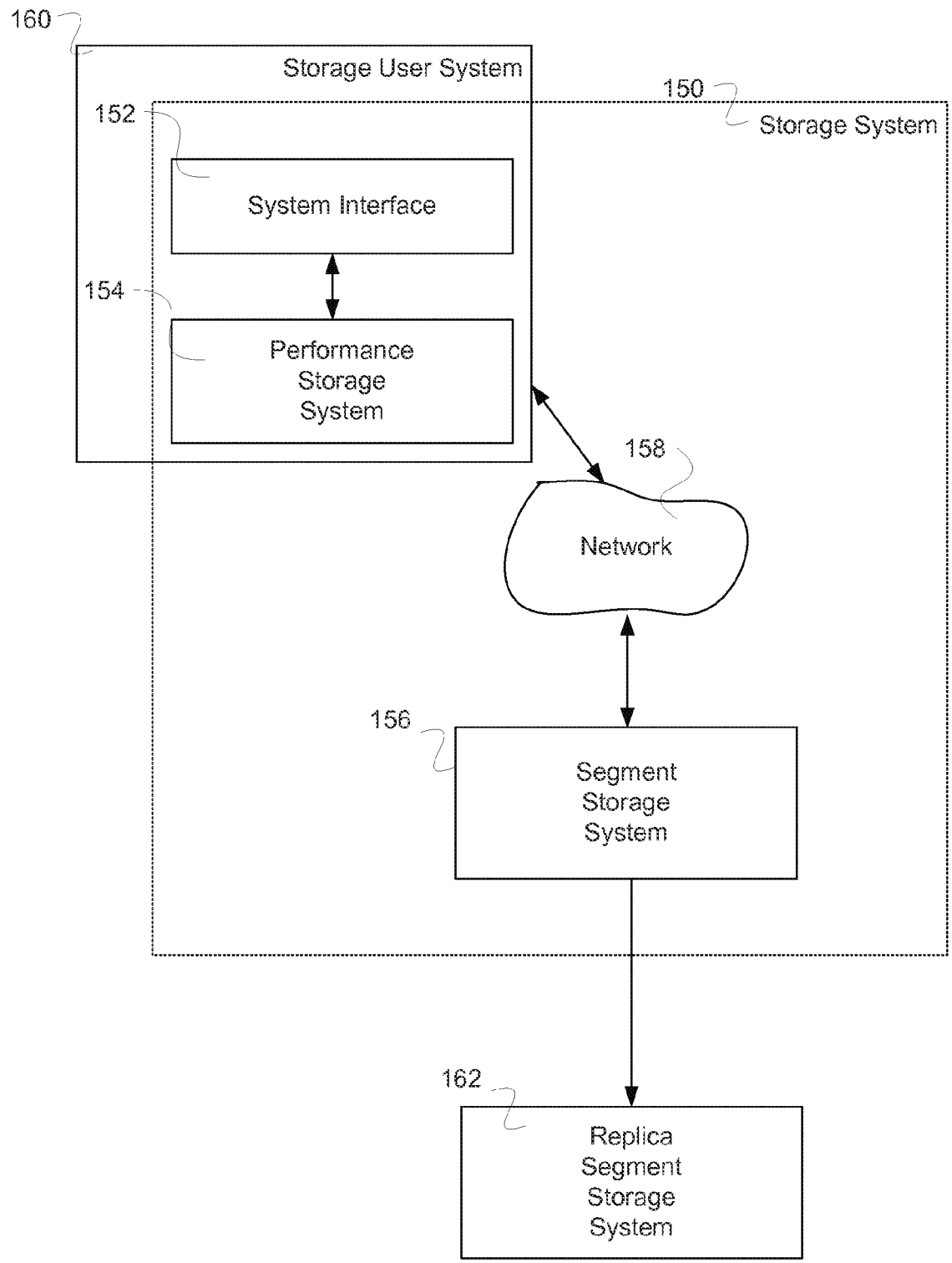
FIG. 1B is a block diagram illustrating an embodiment of a storage system.

FIG. 1B is a block diagram illustrating an embodiment of a storage system. In some embodiments, the storage system of FIG. 1B is similar to the storage system of FIG. 1A with, however, a different partitioning of functionality in the different system locations—for example, the System Interface and Performance Storage System comprise a subsystem within Storage User System and communicate with the Segment Storage System over a Network. In some embodiments, there may be several such Performance Storage Subsystems running in several different Storage User Systems, all communicating with a single Segment Storage System. In the example shown, storage system 150 receives requests to store and/or to retrieve one or more data items. In various embodiments, the one or more data items is/are a part of a data stream or data block or any other appropriate data structure or grouping. Storage system 150 receives requests directly from storage user system 160. In some embodiments, storage user system 160 is one of a plurality of systems able to communicate requests to storage system 150. Storage user system 160 includes performance storage system 154 which combined with segment storage system 150 comprises a high-speed and high-efficiency data storage system. In various embodiments, performance storage system 154 comprises a high speed solid state memory, a RAM disk, a high speed magnetic memory, or any other appropriate memory or combination of memories.

Storage system 150 comprises system interface 152, performance storage system 154, and segment storage system 156. System interface 152 receives requests to store data items to and/or retrieve data items from storage system 150. System interface 152/performance storage system 154 pass retrieved data items to network 158 and to segment storage system 156.

Data items are stored using performance storage system 154. Performance storage system 154 is able to respond efficiently to requests for data to be stored and to be retrieved. Data items are transferred from performance storage system 154 to segment storage system 156. In some embodiments, segment storage system 156 receives data items from performance storage system 154, and the data items are processed to break data items into segments and to deduplicate the segments (e.g., to determine whether each segment has been previously stored, and in the event that the segment has been previously stored, storing a reference instead of storing the segment as received). In some embodiments, data items after being stored in segment storage system 156 are transferred back to performance storage system 154 and stored as a set of segments. In some embodiments, the original data items, stored as originally received, are removed from performance storage system 154 after the data items are transferred back to performance storage system 154.

In some embodiments, segment storage system 156 comprises a storage system that compresses segments (e.g., Lempel-Ziv compression, Lempel-Ziv-Welsh compression, Lempel-Ziv-Renau compression, etc.).

Data items that are requested and are retrieved from performance storage system 154 or if not present in performance storage system 154 from segment storage system 156. In some embodiments, in the event that there are many requests for a data item that is stored in segment storage system 156 and not performance storage system 154, the data item may be transferred to performance storage system 154 so that response performance is improved.

In various embodiments performance storage system 154 comprises flash memory storage, a fiber channel storage device, persistent memory storage, a block addressable memory (e.g., 512K block addressable similar to a hard drive storage block, in contrast to a byte addressable memory or storage, fixed sized block addressing, and/or logical addressable memory), a file system organized memory, random access memory, or any other appropriate storage system or system component. In some embodiments, performance storage system 154 includes data stored as both a compressed data representation (e.g., a set of deduplicated segments) and an uncompressed data representation.

In various embodiments, segment storage system 156 stores data item(s) using variable length segments, has content addressable segments (e.g., using a fingerprint of the segment), is replicated using replica segment storage system 162 (e.g., stores snapshots and/or segments as stored by segment storage system 156), is replicated according to a replication protocol (e.g., according to a time schedule, after a predetermined amount of data is stored, or any other appropriate protocol), has a data representation different from performance storage system 154 (e.g., set of segments vs. original data, content addressing vs. logical or physical addressing, variable block representation vs. fixed block, compressed vs. uncompressed data), or any other appropriate functionality for a segment storage system. In various embodiments, segment storage system 156 is replicated by a plurality of replica segment storage systems similar to replica segment storage system 162 that each replicate a portion of or all of the data items and/or snapshots as stored by segment storage system 156.

Figure 2:
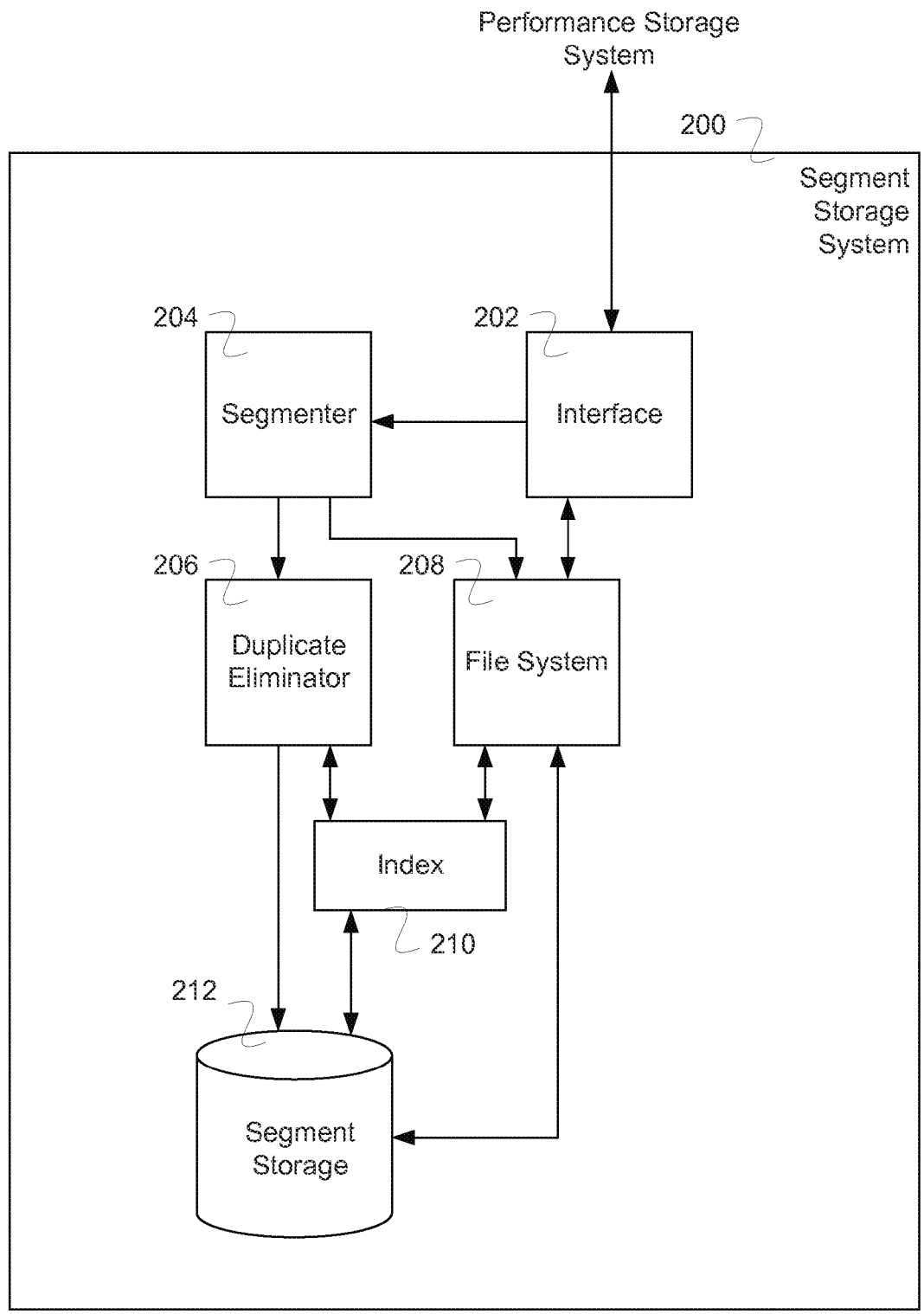
FIG. 2 is a block diagram illustrating an embodiment of a segment storage system.

FIG. 2 is a block diagram illustrating an embodiment of a segment storage system. In some embodiments, the system of FIG. 2 is used to implement segment storage system 106 of FIG. 1. In the example shown, segment storage system 200 comprises interface 202, segmenter 204, duplicate eliminator 206, file system 208, index 210, and segment storage 212. Segment storage system 200 receives data item(s) using interface 202. The data item(s) is/are processed by segmenter 204 and file system 208. Segmenter 204 breaks the data item(s) into segments. In various embodiments, the data item(s) are broken into segments by identifying segment boundaries using a content-based technique (e.g., a function is calculated at various locations of a data item, when the function is equal to a value or when the value is a minimum, a maximum, or other extrema value relative to other function values calculated for the data item), a non-content-based technique (e.g., based on data item property—for example, byte length, title, creation date), or any other appropriate technique. In various embodiments, a segment is restricted to a minimum and/or maximum length, to a minimum or maximum number of segments per data item, or any other appropriate limitation. File system 208 processes information to indicate the segment(s) associated with a data item. In some embodiments, a list of fingerprints is used to indicate segment(s) associated with a data item. Index 210 is used to locate stored segments in segment storage 212.

Duplicate eliminator 206 identifies whether a newly received segment has already been stored in segment storage 212. In the event that a segment has already been stored in segment storage 212, a reference to the previously stored segment is stored instead of storing the newly received segment.

Interface 202 receives a request to retrieve a data item. Interface 202 communicates with file system 208 to retrieve the data item. File System 208 determines the segments associated with the requested data item, communicates with Index 210 to locate segments stored in Segment Store 212, reads appropriate segments stored in segment storage 212, and reconstructs the requested data item. The data item is provided via interface 202 in response to the request.

In some embodiments, file system 208 uses a tree of pointers (e.g., fingerprints) to associate a file with data segments. In the event that a data item changes, a different segment will be associated with the data item, and the pointer changes to nodes in the tree will ripple from the bottom to the top of the tree associated with a file name (or directory structure) efficiently since the appropriate pointers are easily identified using the tree structure.

Figure 3:
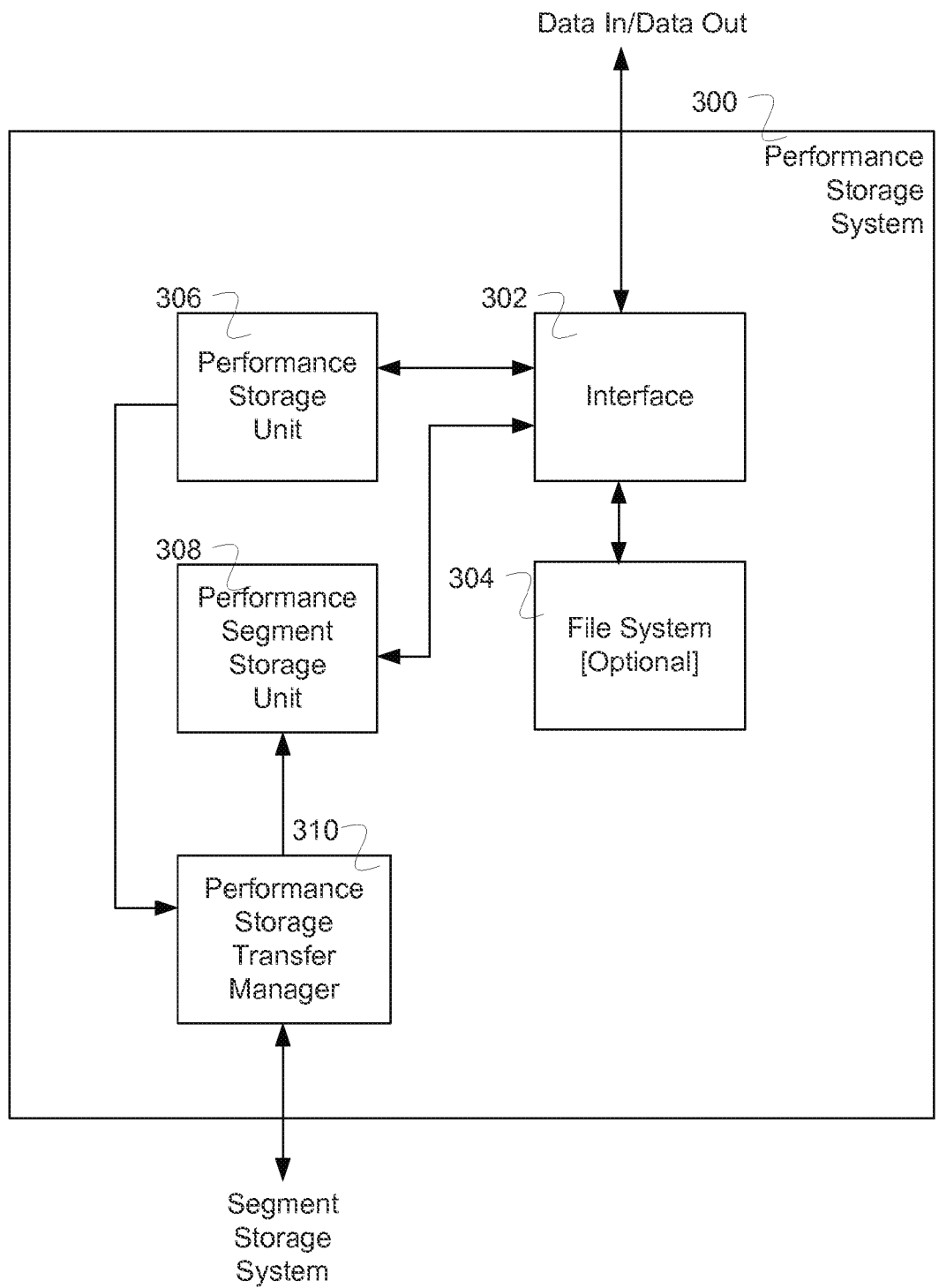
FIG. 3 is a block diagram illustrating an embodiment of a performance storage system.

FIG. 3 is a block diagram illustrating an embodiment of a performance storage system. In some embodiments, the performance storage system of FIG. 3 is used to implement performance storage system 104 of FIG. 1A. In the example shown, performance storage system 300 includes interface 302, file system 304, performance storage unit 306, performance segment storage unit 308, and performance storage transfer manager 310. Interface 302 receives data item(s) to be stored. Data item(s) is/are stored using performance storage unit 306. File system 304 stores information regarding data item(s) in order to facilitate retrieval of data item(s) from performance storage unit 306. In some embodiments, file system 304 is not present and a remote file system or file system stored with the data is used to identify files within performance storage unit 306. Performance storage transfer manager 310 manages the transfer of data item(s) from performance storage unit 306 to a segment storage unit. Performance storage transfer manager 310 also manages the transfer of data item(s) stored as a set of segments to performance segment storage unit 308. In some embodiments, after a transfer of a data item stored as a set of segment to performance segment storage unit 308, the same data item stored in performance storage unit 306 is removed. In some embodiments, performance storage transfer manager 310, may use a segmenter and duplicate eliminator to transfer a data item from the performance storage unit 306 to the performance segment storage unit 308 without first transferring the data item to a segment storage system.

Interface 302 receives requests to retrieve a data item. Data item is retrieved from performance storage unit 306 or performance segment storage unit 308 or segment storage system. In some embodiments, performance storage unit 306 is checked prior to checking performance segment storage unit 308 in the event that a data item is requested to be retrieved. In some embodiments, performance segment storage unit 308 is checked prior to checking segment storage system. In some embodiments, checking is performed by checking using file system 304.

In some embodiments, performance storage transfer manager 310 transfers data item(s) to a segment storage system by taking a snapshot of data item(s) stored in performance storage unit 306. The snapshot enables recall of the data item(s) as stored at the time of the snapshot. In some embodiments, the snapshot is performed according to a snapshot protocol (e.g., a protocol indicating that a snapshot occurs at a time, when the performance storage unit is full, when performance storage unit 306 has only a certain amount of space still available, when a data item has not being accessed within a predetermined time period, when processing bandwidth is available to transfer data item(s) to a data efficient storage system—for example, deduplication data segment storage, compressed storage, etc., or any other appropriate protocol), or when it receives a signal indicating a snapshot should be created.

In some embodiments, segment storage has a complete copy of a snapshot so it can replicate a complete snapshot in capacity-optimized form so that a remote site has a complete copy of the snapshot which is needed for disaster recovery.

In some embodiments, a data item stored in the performance storage unit 306 is not captured using any snapshot (e.g., the file, or data item, was a temporary file, or data item, and not present in performance storage unit 306 during a snapshot, the file, or data item, version was created after a snapshot and then overwritten before a next snapshot, the file, or data item, was an intermediate update that was present only between two snapshots, etc.). In some embodiments, a snapshot is performed using a log of changes to data items or files in performance storage unit 306. In some embodiments, a snapshot is created by retaining the root of a tree of pointers.

In some embodiments, a performance system removes the data item, or file, after (e.g., at once or at a time after depending on the need for the data item to remain in the performance system) the data item or file has been stored or transferred to the segment storage system as a result of a snapshot.

Figure 4:
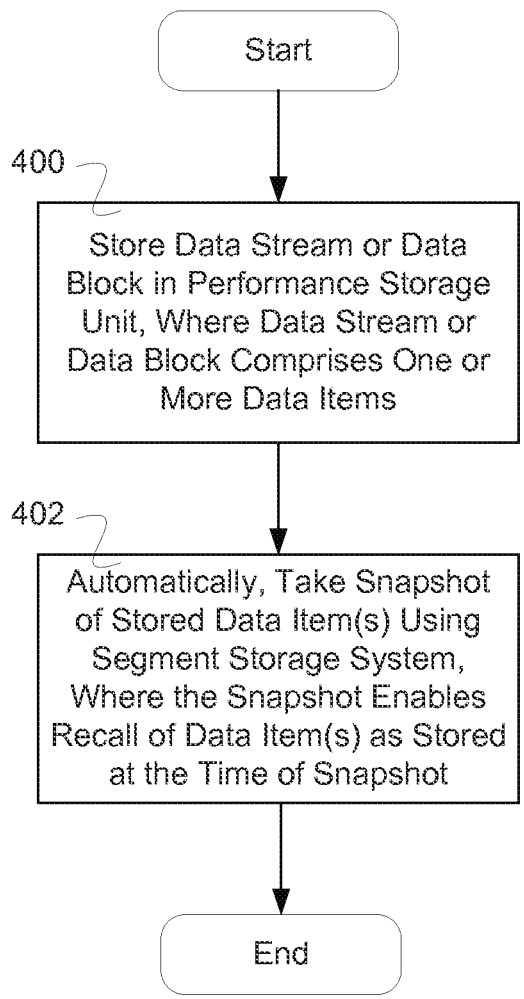
FIG. 4 is a flow diagram illustrating an embodiment of a process for a storage system.

FIG. 4 is a flow diagram illustrating an embodiment of a process for a storage system. In some embodiments, the process of FIG. 4 is implemented by storage system 100 of FIG. 1. In the example shown, in 400 a data stream or data block is stored using a performance storage system, where the data stream or data block comprises one or more data items. In some embodiments, the performance storage system stores the data stream or data block as received (e.g., without compression) and is able to provide rapid storage and recall of the data stream or data block. In various embodiments, the performance storage system comprises a flash memory, a fiber channel drive, a semiconductor based memory, a persistent memory, or any other appropriate performance storage. In 402, a snapshot is taken of stored data item(s) using a segment storage system, where the snapshot enables recall of the data item(s) as stored at the time of the snapshot. In various embodiments, the snapshot occurs according to a snapshot protocol comprising taking a snapshot periodically in time (e.g., every hour, every 12 hours, every day, every week, every month, etc.), taking a snapshot when the performance memory has stored an addition predetermined number of blocks, bytes, or files, taking a snapshot when a usage of the device is low, taking a snapshot of blocks, bytes, or files that have not recently been accessed, or any other appropriate protocol.

Figure 5:
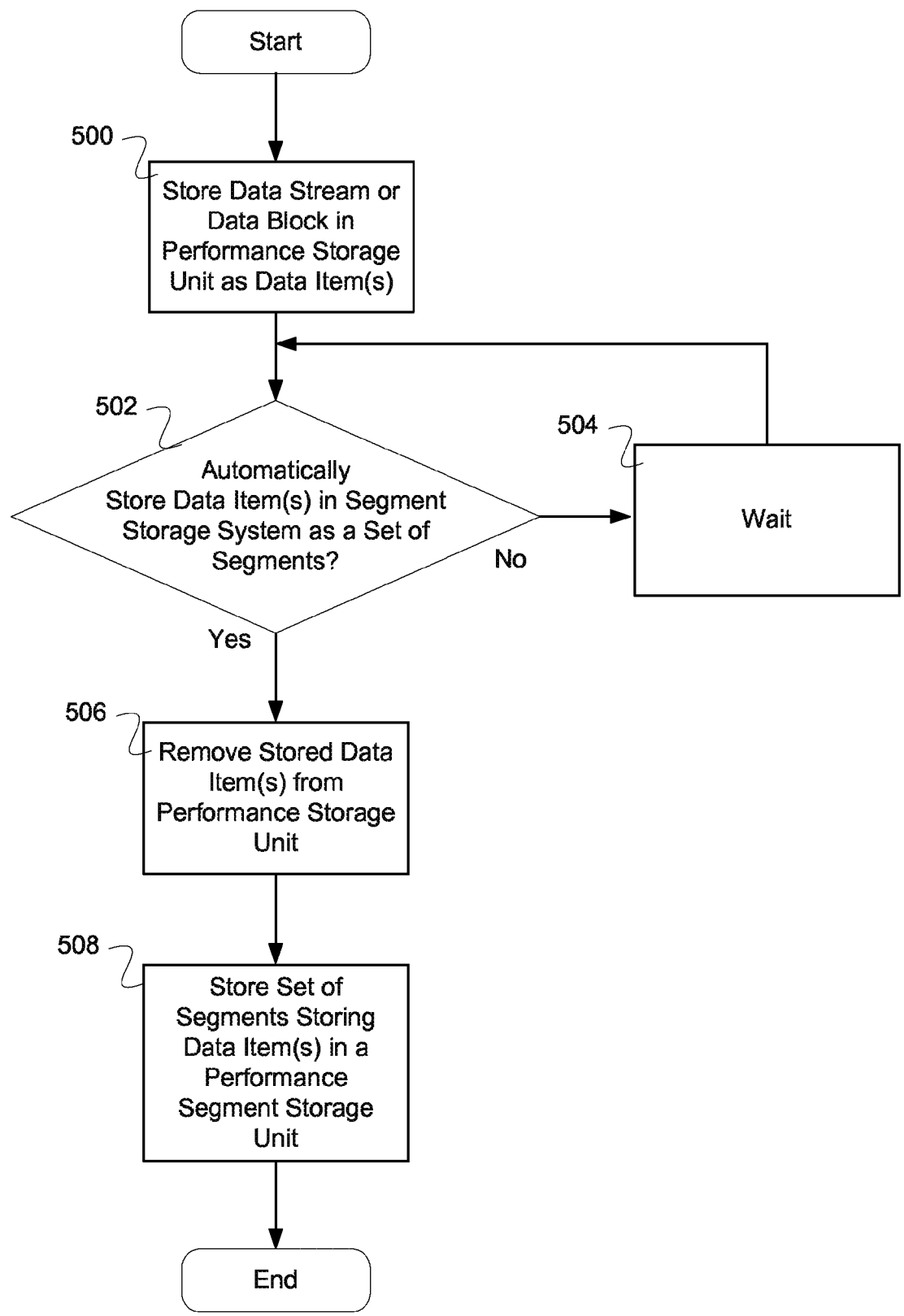
FIG. 5 is a flow diagram illustrating an embodiment of a process for a storage system.

FIG. 5 is a flow diagram illustrating an embodiment of a process for a storage system. In some embodiments, the process of FIG. 5 is implemented by performance storage system 104 of FIG. 1. In the example shown, in 500 a data stream or data block is stored in a performance storage unit as data item(s). In 502, it is determined whether data item(s) are to be automatically stored in a segment storage system as a set of segments. In various embodiments, the data items(s) to be automatically stored are one of, a portion of, or are all of the data items stored by the performance storage unit, or any other appropriate data items stored by the performance storage unit. In 504, in the event that the data item(s) are not to be stored by the segment storage unit, the process waits and control is passed to 502. In various embodiments, the data item(s) are stored automatically according to a protocol where the protocol indicates a schedule (e.g., times, dates, periodicity, etc.) or conditions (e.g., percentage memory full, access frequency, storage unit access loading, processor loading, etc.) when data item(s) are automatically stored. In various embodiments, the data item(s) are stored in response to a received signal. In 506, in the event that data item(s) are automatically stored in a segment storage system as a set of segments, the data item(s) are removed from being stored in the performance storage unit. In some embodiments, some or all of the data item(s) are not removed from the performance storage unit (e.g., in the event that access activity is high or processor load for storage system is high). In 508, the set of segments storing the data item(s) is stored in a performance segment storage unit. In various embodiments, the performance segment storage unit comprises flash memory, a fiber channel storage device, a persistent memory, or any other appropriate performance storage device. In some embodiments, the set of segments for the data item(s) are stored in the performance segment storage unit in the event that performance access is desired for the data item(s).

Figure 6:
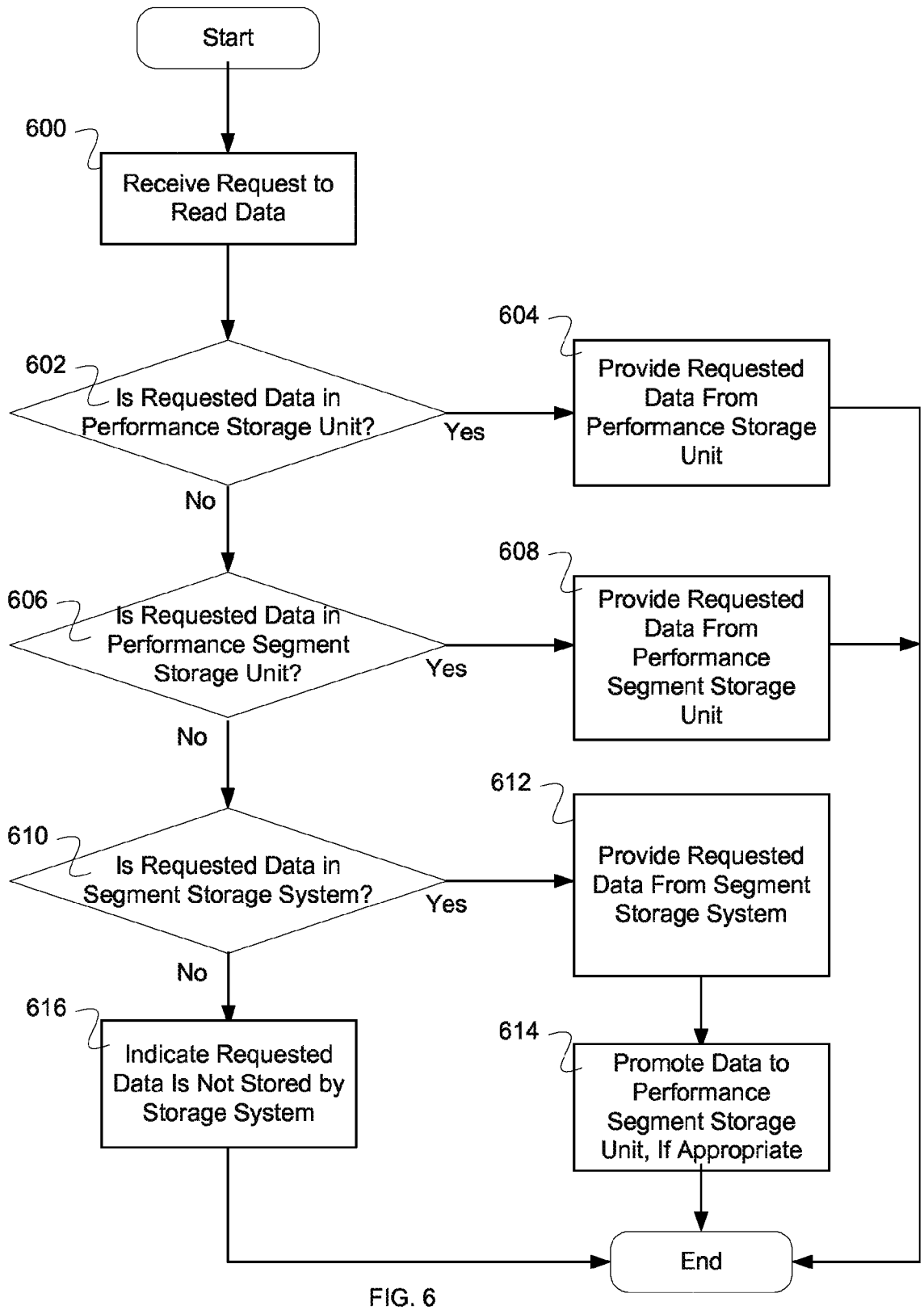
FIG. 6 is a flow diagram illustrating an embodiment of a process for providing requested data from a storage system.

FIG. 6 is a flow diagram illustrating an embodiment of a process for providing requested data from a storage system.

In some embodiments, the process of FIG. 6 is implemented by storage system 100 of FIG. 1. In the example shown, in 600 a request to read data is received. In 602, it is determined whether requested data is in a performance storage unit. In 604, in the event that the requested data is in the performance storage unit, the requested data is provided from the performance storage unit. In 606, in the event that the requested data is not in the performance storage unit, it is determined whether the requested data is in the performance segment storage unit. In 608, in the event that the requested data is in the performance segment storage unit, the requested data is provided from the performance segment storage unit. In 610, in the event that the requested data is not in the performance segment storage unit, it is determined whether the requested data is in a segment storage system. In 612, in the event that the requested data is in the segment storage system, the requested data is provided from the segment storage system. In 614, the data is promoted to a performance segment storage unit, if appropriate (e.g., if it is determined that performance access is desired—for example, multiple requests are likely for the data), and the process ends. In 616, in the event that the requested data is not in segment storage system, indicate that the requested data is not stored by storage system, and the process ends.

Figure 7:
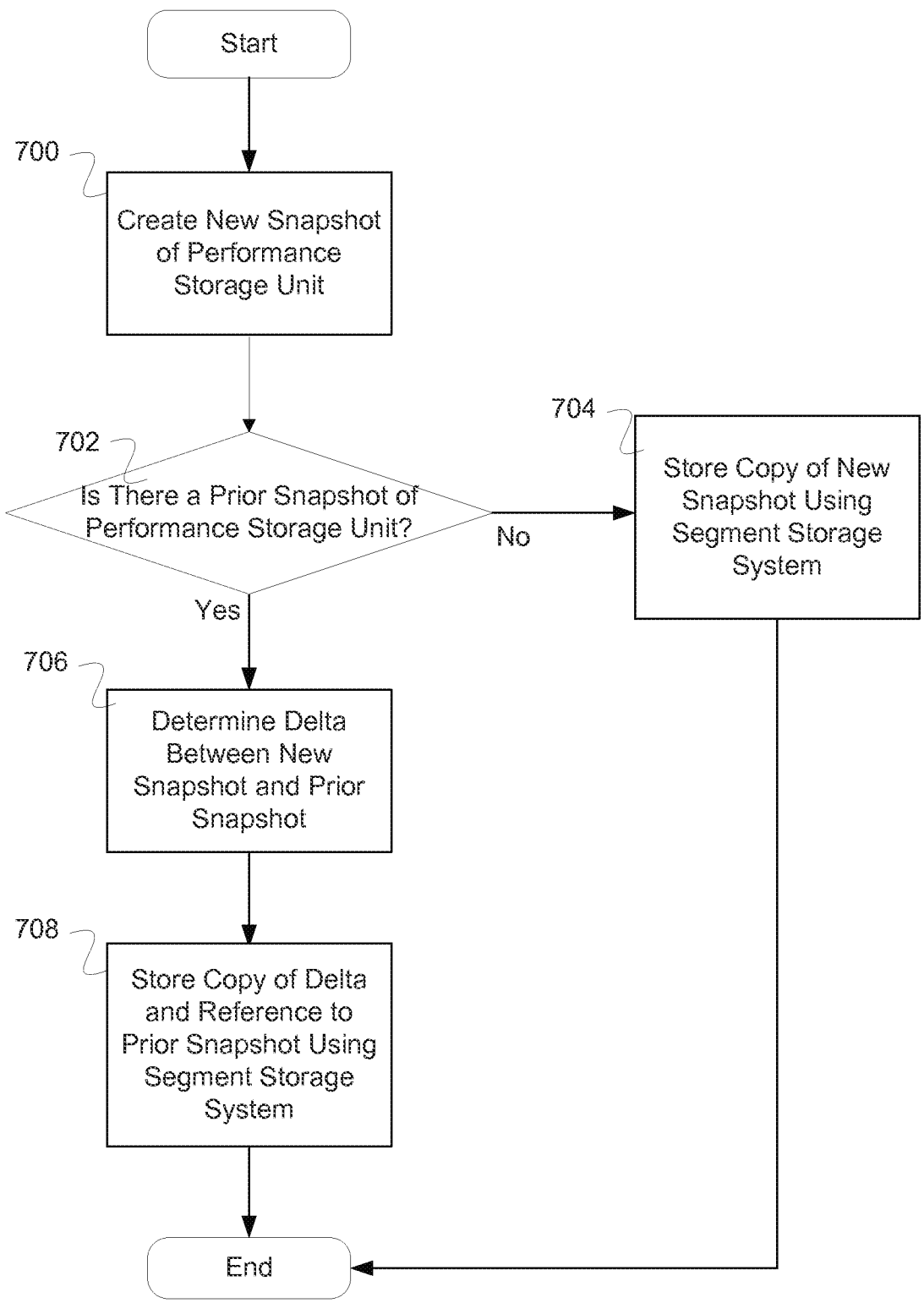
FIG. 7 is a flow diagram illustrating an embodiment of a process for taking a snapshot of data item(s) in a performance storage unit.

FIG. 7 is a flow diagram illustrating an embodiment of a process for taking a snapshot of data item(s) in a performance storage unit. In some embodiments, the process of FIG. 7 is implemented by performance storage transfer manager 310 of FIG. 3. In the example shown, in 700 a new snapshot is created in the performance storage unit. In various embodiments, the snapshot in the performance storage unit includes one, a portion of, or all data items stored by performance storage unit based on a snapshot protocol (e.g., where the protocol sets conditions or criteria for inclusion of the data item(s) in a snapshot by usage, memory fullness, accesses, new data item(s), or any other appropriate conditions or criteria). In 702, it is determined whether there is a prior snapshot of performance storage unit. In 704, in the event that there is no prior snapshot of the performance storage unit, a copy of the new snapshot is stored using a segment storage system. In 706, in the event that there is a prior snapshot of the performance storage unit, then a delta is determined between the new snapshot and the prior snapshot. In 708, a copy of the prior snapshot is created and the delta is applied to the copy to create a copy of the new snapshot in the segment storage system. The copy may be a virtual copy comprising new pointers to the same segments, or it may be a new physical copy or it may be a combination.

In some embodiments, a tree of pointers that includes segments and the associated files or data items for all the files or data items of the snapshot can be used to efficiently identify deltas between snapshots.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for storing data, comprising:
 a performance storage unit for storing one or more data items, wherein a data item of the one or more data items comprises a data file or a data block;
 a segment storage system for storing a snapshot of a stored data item of the one or more data items in the performance storage system, wherein taking the snapshot of the stored data item enables recall of the stored data item as stored at a time of the snapshot, and wherein the segment storage system stores the snapshot of the stored data item as a set of deduplicated segments, wherein the set of deduplicated segments comprises at least one newly stored segment is stored as a reference to a previously stored segment, wherein the performance storage unit is able to provide rapid storage and recall of the one or more data items more rapid than the segment storage system; and
 a performance segment storage unit for storing the stored data item as a set of deduplicated segments in the event the stored data item is desired to be available with high performance, wherein the stored data item stored as a set of deduplicated segments in the performance segment storage unit was transferred back from the segment storage system, wherein the performance segment storage unit also is able to provide rapid storage and recall of the one or more data items stored as a set of deduplicated segments more rapid than the segment storage system.

2. A system as in claim 1, wherein the performance storage unit comprises one or more of the following: a flash memory, a fiber channel storage device, a persistent memory, a block addressable memory, a file system organized memory, or a random access memory.

3. A system as in claim 1, wherein the snapshot is created according to a snapshot protocol.

4. A system as in claim 1, wherein the snapshot is created in response to an external signal.

5. A system as in claim 1, wherein a second stored data item of the one or more data items is not captured using any snapshot.

6. A system as in claim 1, wherein the snapshot is taken using a log of changes to the one or more data items stored by the performance storage unit.

7. A system as in claim 1, wherein the performance storage unit removes the stored data item after the stored data item is stored by taking the snapshot on the segment storage system.

8. A system as in claim 1, wherein the segment storage system stores the snapshot using variable length segments.

9. A system as in claim 1, wherein the segment storage system has content addressable segments.

10. A system as in claim 9, wherein the content addressable segments are addressed using a fingerprint of a segment.

11. A system as in claim 1, wherein the segment storage system is replicated using a replica segment storage system.

12. A system as in claim 11, wherein the replica stores a copy of the snapshot of the stored data item.

13. A system as in claim 11, wherein the replication of the segment storage system occurs according to a replication protocol.

14. A system as in claim 1, wherein the performance storage unit stores the one or more data items in an uncompressed data representation, wherein uncompressed data representation comprises storing the one or more data items as received.

15. A system as in claim 1, wherein the segment storage system includes a complete copy of all data items comprising a snapshot, wherein the segment storage system replicates all the data items in capacity optimized form using the complete copy of all data items.

16. A method for storing data, comprising:
 storing one or more data items in a performance storage unit, wherein a data item of the one or more data items comprises a data file or a data block; and
 storing in a segment storage system a snapshot of a stored data item of the one or more data items in the performance storage system, wherein taking of the snapshot of the stored data item enables recall of the stored data item as stored at a time of the snapshot, and wherein the segment storage system stores the snapshot of the stored data item as a set of deduplicated segments, wherein the set of deduplicated segments comprises at least one newly stored segment is stored as a reference to a previously stored segment, wherein the performance storage unit is able to provide rapid storage and recall of the one or more data items more rapid than the segment storage system;

storing in a performance segment storage unit the stored data item as a set of deduplicated segments in the event the stored data item is desired to be available with high performance, wherein the stored data item stored as a set of deduplicated segments in the performance segment storage unit was transferred back from the segment storage system, wherein the performance segment storage unit also is able to provide rapid storage and recall of the one or more data items stored as a set of deduplicated segments more rapid than the segment storage system.

17. A computer program product for storing data, the computer program product being embodied in a non-transitory computer readable storage medium and comprising computer instructions for:

storing one or more data items in a performance storage unit, wherein a data item of the one or more data items comprises a data file or data block; and storing in a segment storage system a snapshot of a stored data item of the one or more data items in the performance storage system, wherein taking of the snapshot of the stored data item enables recall of the stored data item as stored at a time of the snapshot, and wherein the segment storage system stores the snapshot of the stored data item as a set of deduplicated segments, wherein the set of deduplicated segments comprises at least one newly stored segment is stored as a reference to a previously stored segment, wherein the performance storage unit is able to provide rapid storage and recall of the one or more data items more rapid than the segment storage system;

storing in a performance segment storage unit the one or more data items as a set of deduplicated segments in the event the one or more data items is desired to be available with high performance, wherein the stored data item stored as a set of deduplicated segments in the performance segment storage unit was transferred back from the segment storage system, wherein the performance segment storage unit also is able to provide rapid storage and recall of the one or more data items stored as a set of deduplicated segments more rapid than the segment storage system.

\* \* \* \* \*